(12) United States Patent
Bandic et al.

(10) Patent No.: US 7,941,911 B2
(45) Date of Patent: May 17, 2011

(54) PLANARIZATION METHODS FOR PATTERNED MEDIA DISKS

(75) Inventors: Zvonimir Z. Bandic, San Jose, CA (US); Elizabeth Ann Dobisz, San Jose, CA (US); Jui-Lung Li, San Jose, CA (US); Henry Hung Yang, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 868 days.

(21) Appl. No.: 11/641,237

(22) Filed: Dec. 18, 2006

(65) Prior Publication Data

US 2008/0141523 A1    Jun. 19, 2008

(51) Int. Cl.
*G11B 5/127*    (2006.01)
*H04R 31/00*    (2006.01)

(52) U.S. Cl. ............... 29/603.15; 29/603.13; 29/603.16; 427/128; 427/129; 451/8; 451/41; 451/63

(58) Field of Classification Search ............... 29/603.13, 29/603.16, 603.15; 427/128, 129; 451/8, 451/9, 10, 11, 41, 63
See application file for complete search history.

(56) References Cited

U.S. PATENT DOCUMENTS

| | | | |
|---|---|---|---|
| 5,820,769 A | 10/1998 | Chou | |
| 6,177,175 B1* | 1/2001 | Hashimoto | 428/141 |
| 6,214,434 B1 | 4/2001 | Xuan et al. | |
| 6,313,969 B1 | 11/2001 | Hattori et al. | |
| 6,351,339 B1 | 2/2002 | Bar-Gadda | |
| 6,420,058 B1 | 7/2002 | Haratani et al. | |
| 6,440,520 B1 | 8/2002 | Baglin et al. | |
| 6,454,915 B1* | 9/2002 | Shiratori et al. | 204/192.2 |
| 6,495,240 B1 | 12/2002 | Wada et al. | |
| 6,579,634 B2 | 6/2003 | Saito | |
| 6,583,957 B1 | 6/2003 | Takeshita et al. | |
| 6,614,731 B2* | 9/2003 | Ishii | 369/13.54 |
| 6,703,099 B2 | 3/2004 | Belser | |
| 6,719,841 B2 | 4/2004 | Chen et al. | |
| 6,859,998 B2* | 3/2005 | Kruger et al. | 29/603.13 |
| 7,210,217 B2* | 5/2007 | Sasaki et | 29/603.16 |
| 7,367,112 B2* | 5/2008 | Nix et al. | 29/603.15 |
| 2002/0182312 A1 | 12/2002 | Gurovich et al. | |
| 2003/0034862 A1* | 2/2003 | Nishikawa et al. | 335/106 |
| 2003/0145453 A1* | 8/2003 | Kamata et al. | 29/603.01 |
| 2004/0161576 A1 | 8/2004 | Yoshimura et al. | |
| 2004/0258833 A1* | 12/2004 | Kamata et al. | 427/130 |
| 2005/0013971 A1* | 1/2005 | Nam | 428/141 |

(Continued)

FOREIGN PATENT DOCUMENTS

JP    198602311960    12/1990

(Continued)

*Primary Examiner* — Derris H Banks
*Assistant Examiner* — Jeffrey Carley
(74) *Attorney, Agent, or Firm* — Mintz, Levin, Cohn, Ferris, Glovsky and Popeo, P.C.

(57) ABSTRACT

A method is provided for forming a plurality of regions of magnetic material in a substrate having a first approximately planar surface. The method comprises the steps of fabricating projections in the first surface of the substrate, depositing onto the first surface a magnetic material in such a way that the tops of the projections are covered with magnetic material, and depositing filler material atop the substrate so produced. The filler material may then be planarized, for example by chemical-mechanical polishing. In an alternative embodiment magnetic material is deposited on a substrate and portions of it are removed, leaving islands of material. Filler material is then deposited, which may be planarized.

19 Claims, 14 Drawing Sheets

U.S. PATENT DOCUMENTS

| | | | |
|---|---|---|---|
| 2005/0214953 A1* | 9/2005 | Lee et al. | 438/3 |
| 2006/0002022 A1* | 1/2006 | Feldbaum et al. | 360/126 |
| 2006/0165959 A1* | 7/2006 | Bandic et al. | 428/172 |
| 2006/0166506 A1* | 7/2006 | Okawa et al. | 438/706 |
| 2007/0069429 A1* | 3/2007 | Albrecht et al. | 264/482 |

FOREIGN PATENT DOCUMENTS

| | | |
|---|---|---|
| JP | 3137824 | 6/1991 |
| JP | 4251435 | 9/1992 |
| JP | 2001134935 | 5/2001 |

* cited by examiner

PLANARIZATION METHODS FOR PATTERNED MEDIA DISKS

TECHNICAL FIELD

This invention relates generally to magnetic storage media and in particular to methods for manufacturing media with high density storage capabilities.

BACKGROUND

It has been believed for some time now that the current magnetic recording media will at some density become unusable on account of supraparamagnetism. Supraparamagnetism is a thermal instability of the magnetization in an unpatterned magnetic recording medium which is projected to occur as the sizes of the magnetic domains approach the sizes of the magnetic metal grains. Because of this belief, there has been a good deal of research into different ways of overcoming the supraparamagnetic limit by making patterned magnetic recording media. See, e.g., C. A. Ross, "Patterned Magnetic Media," *Annual Rev. Mater. Res.* 31:203-35 (2001). Furthermore, patterned media offer less magnetic recording noise at the same recording density point.

In more detail, as we scale continuous media to smaller bit (or magnetic domain) dimensions, we also have to scale grain sizes, because signal to noise ratio is roughly proportional to the number of grains. At some point, those grain sizes become so small, that the thermal energy alone is sufficient to flip the bit, and the media becomes unstable. The critical grain volume $V_g$ that determines the onset of supraparamagnetic limit is determined by the condition that the stored magnetic energy $K_u V_g$ is about 40-60 times larger than the thermal energy $k_B T$, where $K_u$ and $k_B$ are the magnetic anisotropy and Boltzmann constant, and T is the temperature. When bit densities are high enough that grain sizes in unpatterned media fall below the critical grain volume, patterned media is preferred since it offers one relatively large island of magnetic material, acting as a single magnetic domain, and therefore has an improved signal to noise ratio. It is believed that recourse to patterned media may become necessary at recording densities of very roughly 500 Gb/in$^2$ to 1000 Gb/in$^2$.

Possible approaches to achieving densities of 500 Gb/in$^2$ include perpendicular recording and thermally assisted writing on high coercivity media. However, these approaches have not yet been demonstrated to be viable for data storage densities on the order of 500 Gb/in$^2$.

Perpendicular recording refers to data recording on a hard disk in which the poles of the magnetic bits on the disk are aligned perpendicularly to the surface of the disk platter. Perpendicular recording can deliver up to 10 times the storage density of longitudinal recording, on the same recording media. Current hard disk technology with longitudinal recording has an estimated limit of 100-150 Gb/in$^2$ due to the superparamagnetic effect. As discussed above, it is estimated that, when the bits are of the size required to achieve densities above that limit, the grain size becomes so small that thermal energy alone can flip its magnetization direction. This would cause random data corruption which would be unacceptable in practice. Perpendicular recording gets around the supraparamagnetic limit by re-aligning the poles of the bits perpendicularly to the surface of the disk so they can be placed closer together on the platter, thus increasing storage density by a factor of 10.

U.S. Pat. Nos. 6,313,969, 6,420,058, and 6,440,520, for example, teach methods of making patterned magnetic media.

An important issue with patterned magnetic media is the level of perfection associated with the planarization of the disk. For example, the read/write head of a data storage device must be able to fly over the face of a disk rotating at speeds ranging from 3600 up to 15000 rpm, to read or write on concentric data tracks disposed on the surface of the disk. The spacing between read/write head and disk surface as the head flies over that surface is measured in nanometers, thus requiring minimal anomalies in the disk surface to assure smooth flying for the read/write head. A preferred approach to minimizing anomalies in the media used in a data storage device is to planarize the patterned media.

There is consequently a need in the art for a method of making patterned magnetic recording media which allows good planarization as a part of the manufacturing process.

SUMMARY OF THE INVENTION

In one embodiment of the invention, there is provided a method of forming a plurality of regions of magnetic material in a substrate having a first approximately planar surface. The method comprises the steps of fabricating projections in the first surface of the substrate, depositing onto the first surface a magnetic material in such a way that the tops of the projections are covered with magnetic material, and depositing filler material atop of the substrate so produced. The filler material may then be planaraized by known techniques.

In an alternative embodiment of the invention, there is provided a method of forming a plurality of islands of magnetic material atop a substrate having a first approximately planar surface. The method comprises the steps of depositing magnetic material over the first approximately planar surface, selectively removing portions of the magnetic material so as to leave islands comprising the material, and depositing filler material atop the substrate produced in the preceding step.

FIGURES

Figure 4:
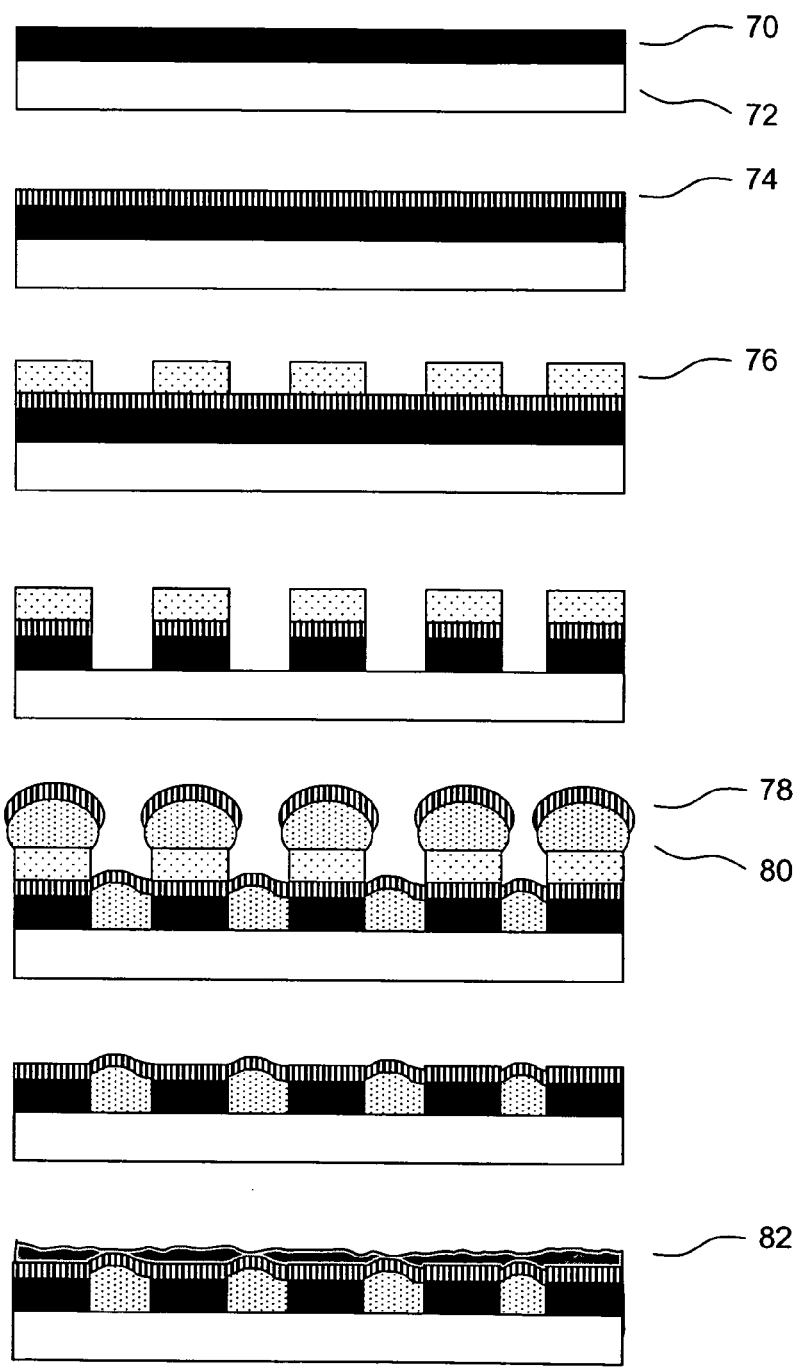
Figure 5:
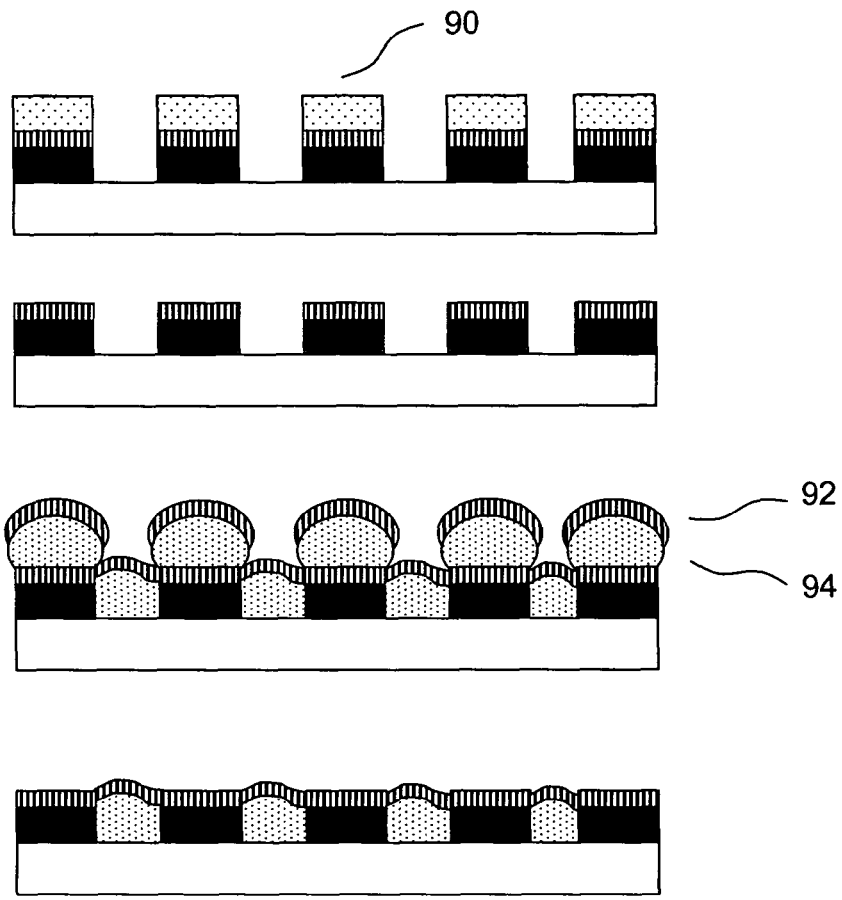
Figure 6:
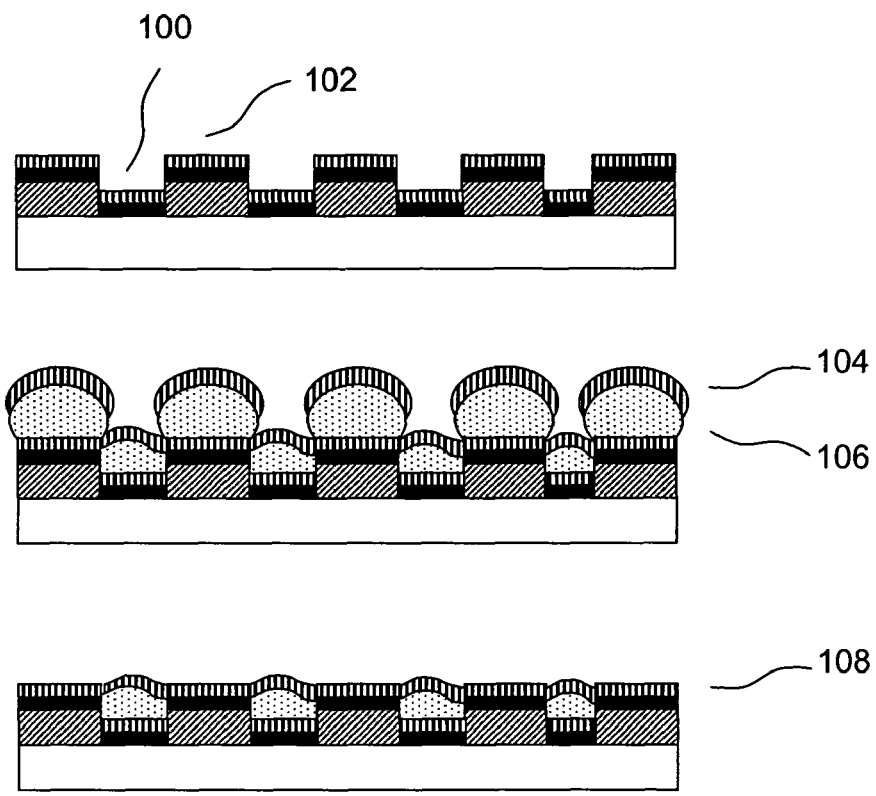

FIGS. 4, 5, and 6 depict schematically (not to scale) the state of a substrate after successive processing steps making up further methods within the scope of the invention.

Figure 7:
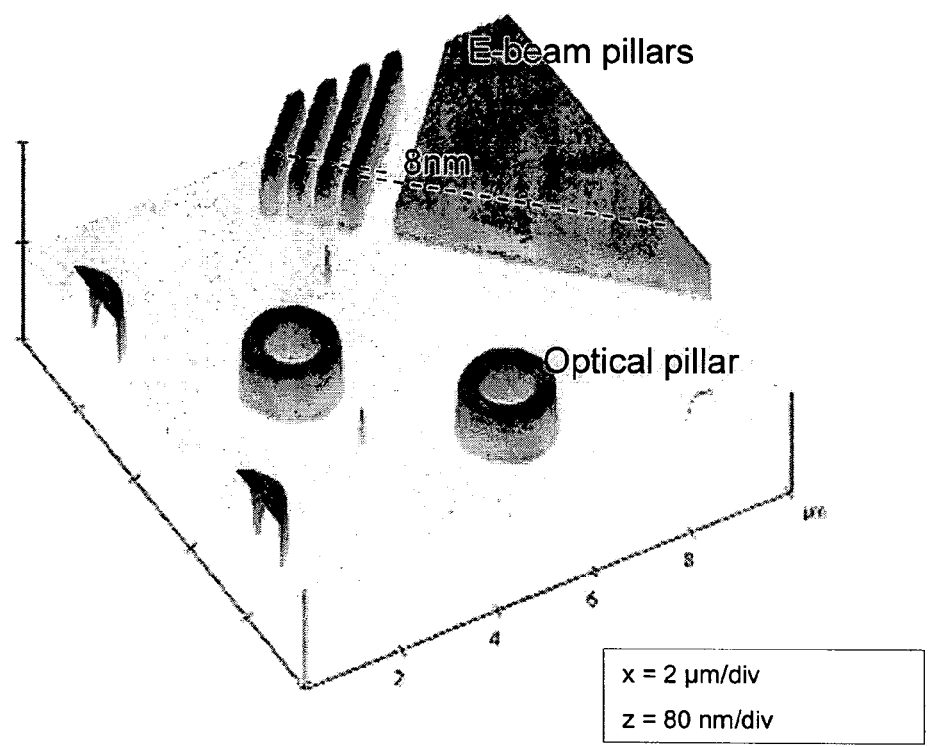

FIG. 7 depicts the shape of the substrate of Example 1 at an intermediate stage of processing, after the deposition of the SiO$_2$ and before the chemical-mechanical polishing.

Figure 8:
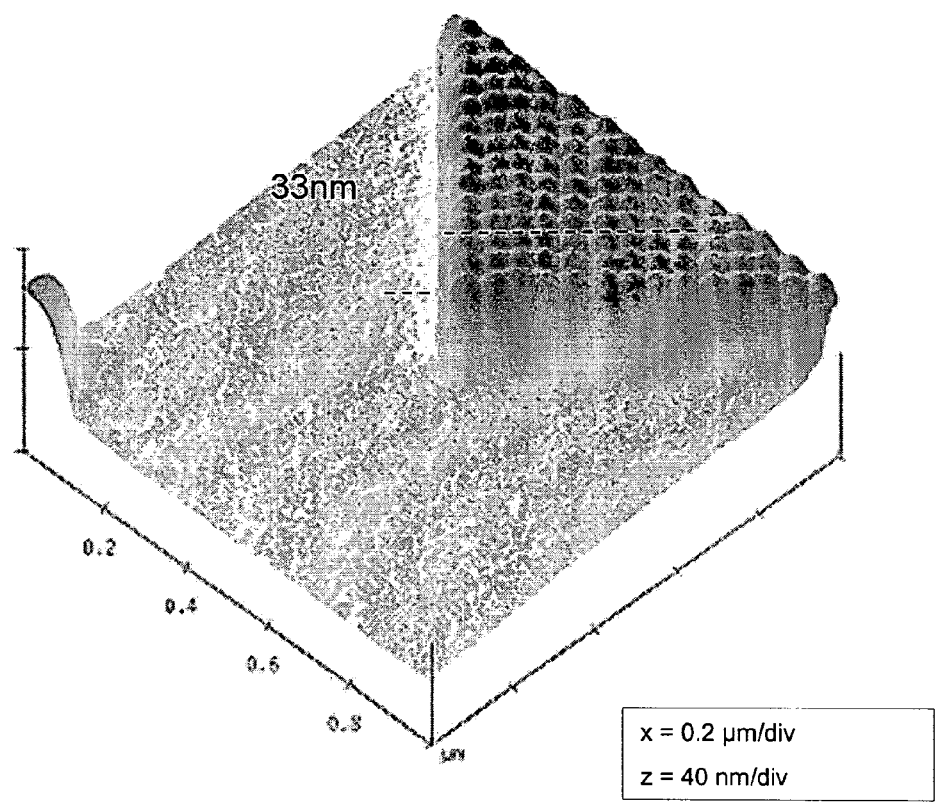

FIG. 8 is a view of the shape of the substrate of Example 1 at higher magnification than FIG. 7.

Figure 9:
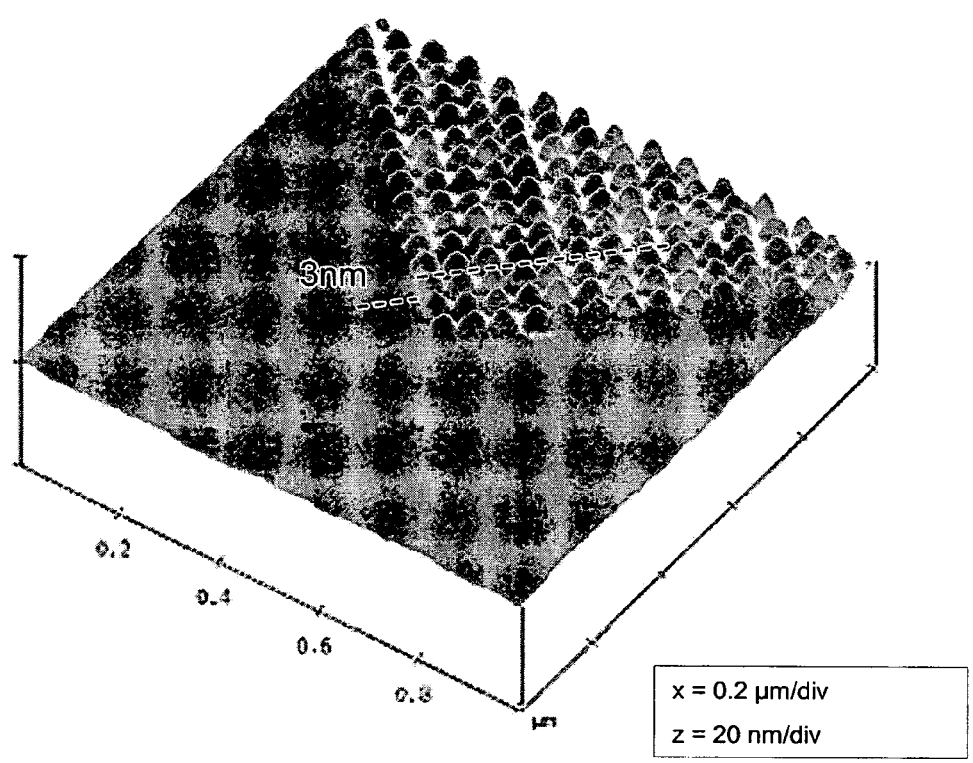

FIG. 9 depicts the shape of the substrate of Example 1 after chemical-mechanical polishing.

Figure 10A:
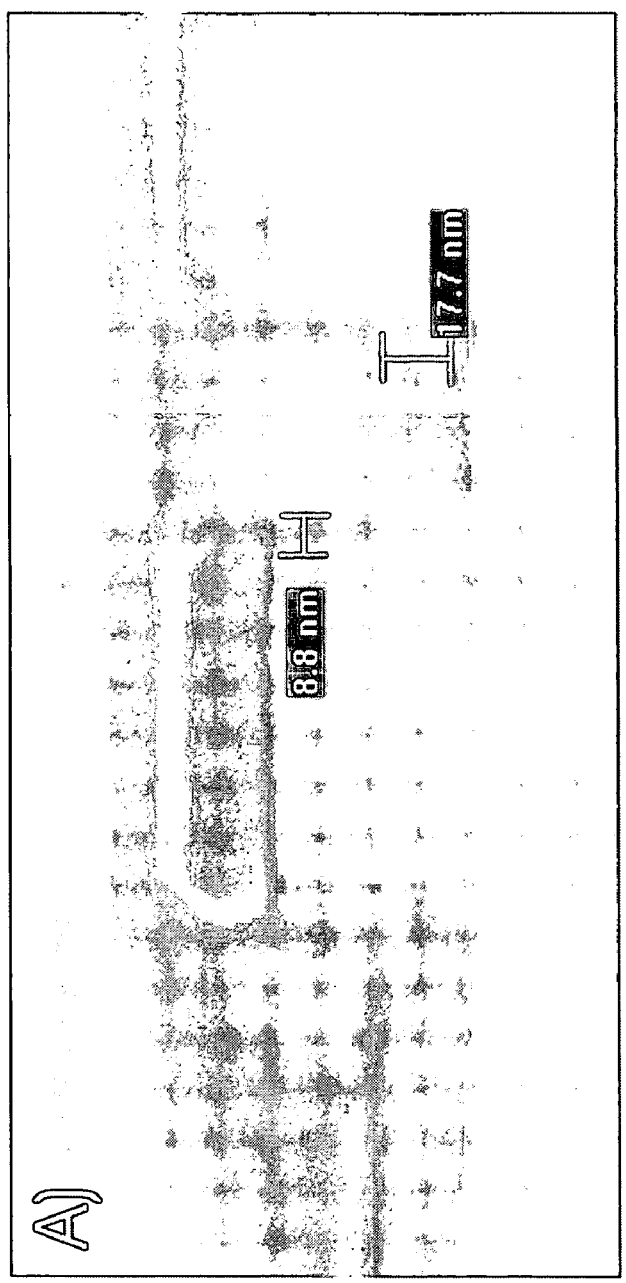
Figure 10B:
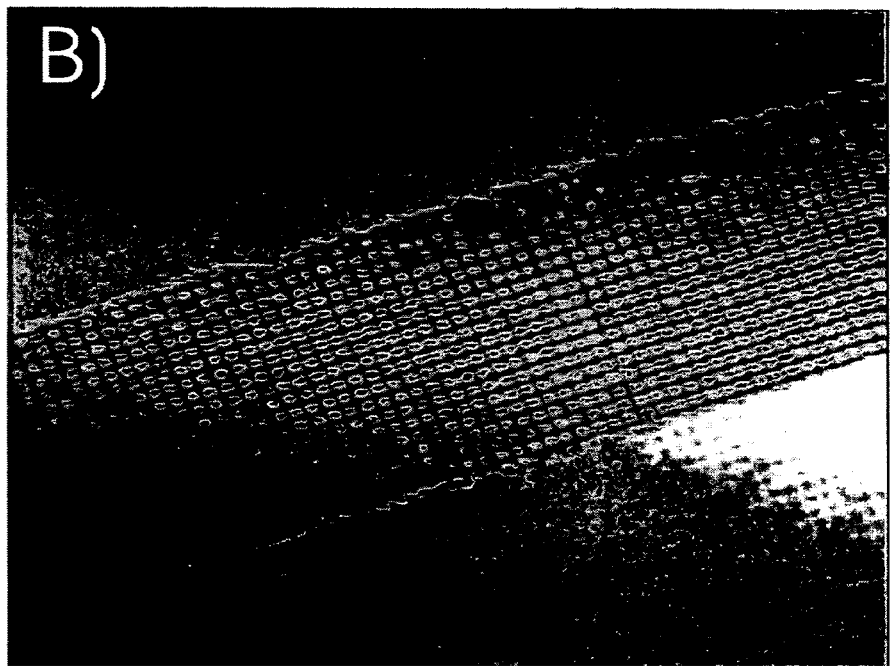
Figure 10C:
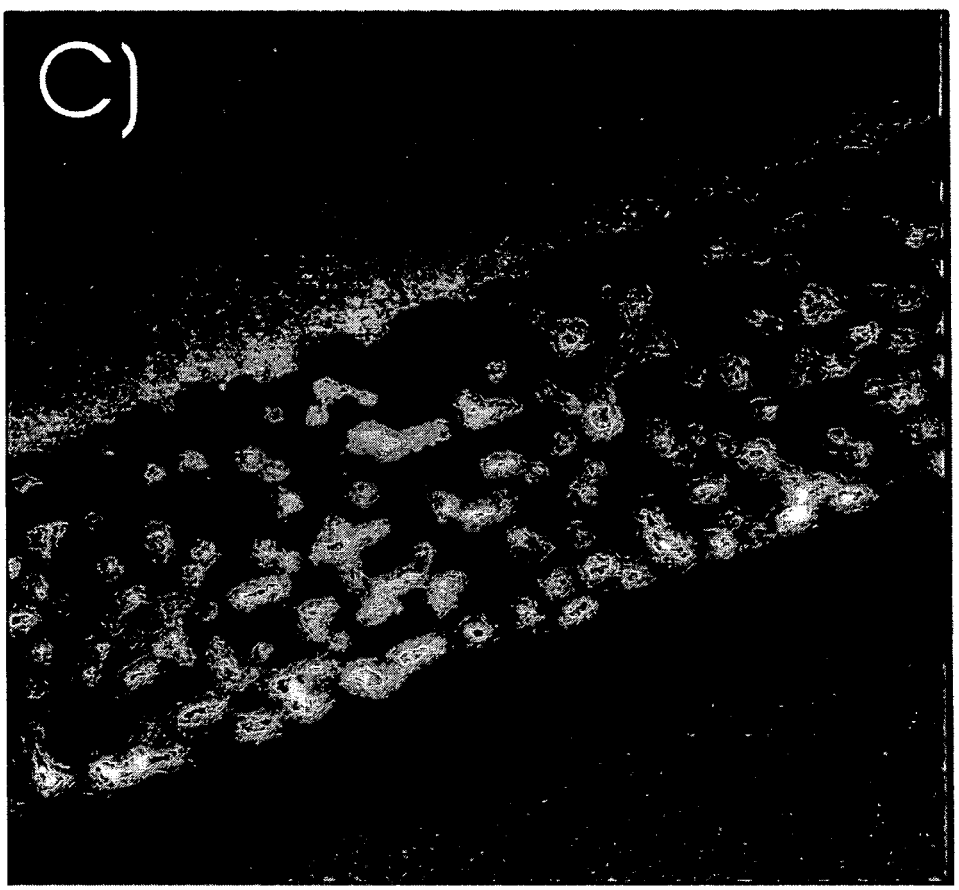

FIGS. 10A-10C depict the result of the magnetic material deposition of Example 2 via a cross-sectional SEM image (FIG. 10A), atomic force microscopy (FIG. 10B), and magnetic force microscopy (FIG. 10C).

DETAILED DESCRIPTION OF PREFERRED EMBODIMENTS

Before describing the present invention in detail, it is to be understood that this invention is not limited to specific solvents, materials, or device structures, as such may vary. It is also to be understood that the terminology used herein is for the purpose of describing particular embodiments only, and is not intended to be limiting.

As used in this specification and the appended claims, the singular forms "a," "an," and "the" include both singular and plural referents unless the context clearly dictates otherwise. Thus, for example, reference to "a ferromagnetic material" includes a plurality of ferromagnetic material as well as a single ferromagnetic material, reference to "a temperature" includes a plurality of temperatures as well as single temperature, and the like.

The term "substrate" refers to any type of substrate considered suitable for the manufacture of a magnetic recording medium. The term also refers to the substrate and the materials deposited on it during or after any of the various stages of treatment through which it goes during the process of magnetic recording medium manufacture, for example during or after the deposition of a magnetic layer.

In describing a substrate comprising multiple layers, reference is sometimes made to an "upper" layer, a "top" layer, or a "lower" layer. In general, an "upper" layer refers to one which is deposited after the layers described as lower. There is no intention to suggest by this terminology that the deposition must necessarily be done with the "upper" layer lying above the "lower" layer in the ordinary sense of being farther from the center of the earth. Similarly, when one speaks of depositing "atop" a substrate or a layer of a substrate, one means only that the deposited material is added to the side of the substrate to which material has previously been added; there is no implication that the deposition takes place with the material flowing downward in the ordinary sense of flowing towards the center of the earth.

"Optional" or "optionally" means that the subsequently described circumstance may or may not occur, so that the description includes instances where the circumstance occurs and instances where it does not.

Relevant information regarding the fabrication processes known to those of skill in the art can be found, for example, in Sami Franssila, *Introduction to Microfabrication* (John Wiley & Sons, 2004).

In one embodiment of the invention, there is provided a method of forming a plurality of regions of magnetic material in a substrate having a first approximately planar surface. The method comprises the steps of fabricating projections in the first surface of the substrate, depositing onto the first surface a magnetic material in such a way that the tops of the projections are covered with magnetic material, and depositing filler material atop of the substrate so produced. The filler material may then be planarized by known techniques.

In carrying out this embodiment of the invention, it is preferred that a stop material be deposited on top of the substrate after the magnetic material has been deposited and before the filler material is deposited. This stop layer may facilitate the use of certain planarization techniques such as chemical-mechanical polishing (CMP).

The substrate upon which this embodiment of the invention is practiced conveniently has an upper layer which has been deposited upon the lower layer. The upper layer may be, for example, $SiN_x$, silicon dioxide, or silicon, and the lower layer may, for example, be glass, aluminum, or silicon. The process of formation of the projections in the surface may conveniently take place in the upper layer. In this way the overall stability and handling of the substrate is provided by the lower layer, while the upper layer can be chosen to be one in which it is simpler to make projections.

The projections may be made by any process which is convenient, for example in light of the material of which the approximately planar surface of the substrate is made. In general, the projections may be formed by removing material in a pattern on the surface to a suitable depth which leaves the projections standing in relief. For example, it may be convenient to deposit resist atop the surface, pattern the resist, and use the patterned resist as a mask in reactive ion etching. The patterning of the resist may take place by a method known in the art, such as photolithography or nanoimprinting. Other techniques for producing the desired pattern on the resist layer include electron beam, projection beam or ion beam lithography, or short wavelength lithography.

The projections are preferably separate in that they do not physically touch each other, at least in the areas close to their tops. For magnetic recording applications, such physical separation between the projections may be desired in order to physically separate the magnetic material atop each projection from that on adjacent projections. The projections may be, for example, in a regular pattern like the red squares of a checkerboard. The areas of the surface which are not part of the projections may consist of areas which touch and merge. The projections are commonly also referred to as posts, pillars, or islands.

The deposition of the magnetic material atop the projections may also be made by any process which is convenient. It may for example be made by evaporation, chemical vapor deposition, or physical vapor deposition in any of its variants.

The magnetic material may also be of any type which is considered useful for the magnetic recording system being designed. For example, it may consist of a single layer of a suitable material such as FeN, NiFe, or CoZr. It may also consist of multiple layers of different materials, such as Co and Pt or Ni or Pd. A preferred magnetic material is a set of layers of $Ta/Pd/(Co/Pd)_n/Pd$, for example 1 nm Ta/3 nm Pd/(0.32 nm Co/0.85 nm A Pd)$_8$/1.5 nm Pd.

If a stop layer is used, it may also be of a suitable material which for example causes a discernible slowing down of the planarization process. It may be, for example, diamond-like carbon (DLC) or TiN.

Diamond-like carbon (DLC) refers to many new forms of carbon which have both graphitic and diamond-like characteristics. DLC has many possible material properties as it becomes more diamond-like and crystalline. Its density is generally between graphite and diamond (2.2-3.5 grams/cubic centimeter). The optical properties are normally diamond-like in index of refraction but a high extinction coefficient makes the material dark. DLC is being used in the semiconductor industry and as a wear resistant coating for disks used in hard disk drives.

The filler layer may also be of a suitable material which may be more rapidly removed in planarization than the stop layer. This filler layer may be, for example, silicon dioxide, alumina, a metallic nitride.

The step of planarizing may also be carried out by any suitable method. Chemical-mechanical polishing is expected to be quite satisfactory in hard disk applications, particularly if a stop layer is employed. Alternative methods may include planarization with a directional high-incidence-angle broad ion beam, or application of spin-coated or dip-coated polymer that may be planarized by the type of disk burnishing process already typically utilized in the disk manufacturing process. Regarding disk burnishing see, for example, U.S. Pat. No. 7,094,129 assigned to the assignee of the present application and the references cited in that patent.

Typically, for hard disk drive magnetic recording media, one would wish to apply a lubricant after the step of planarization. Lubricants for disk drives are well known and there are a number of lubricants which can be used.

Figure 1A:
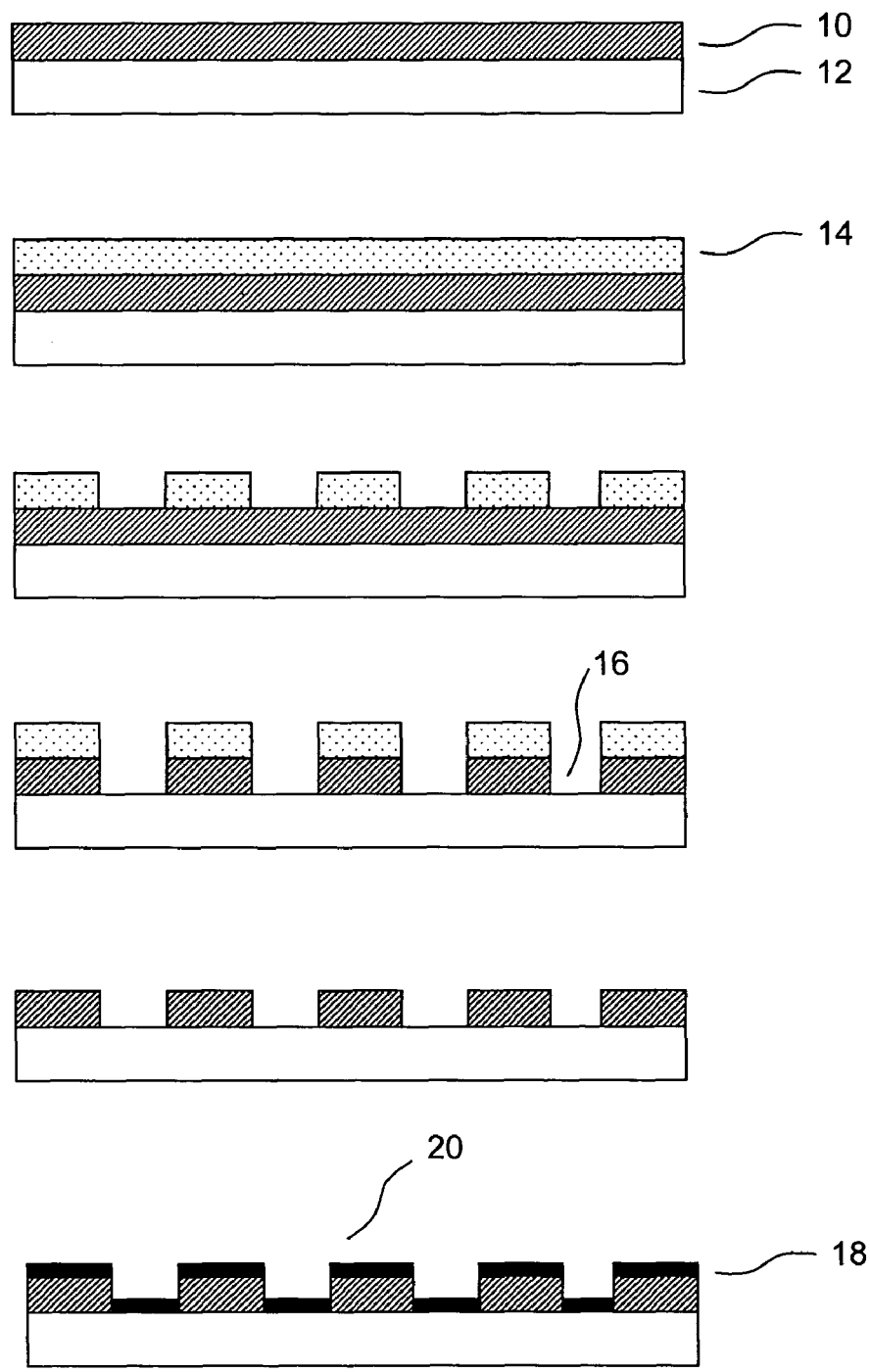
FIGS. 1A-1B depict schematically (not to scale) the state of a substrate after successive processing steps making up a method of the invention.
Figure 1B:
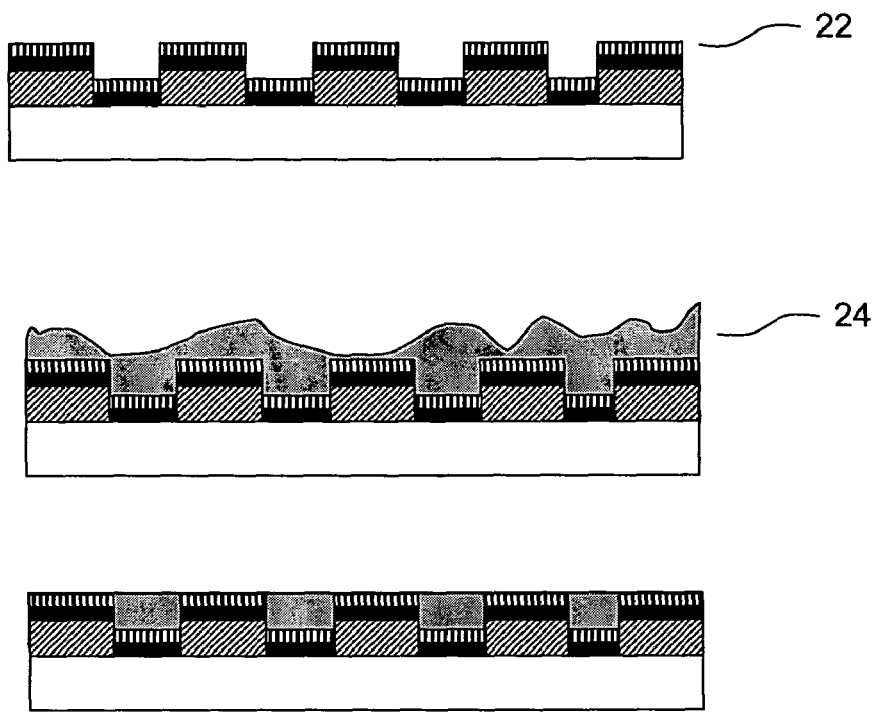

FIGS. 1A-1B depict a particular method within the embodiment being discussed here. In the top line of FIG. 1A, we see the starting substrate which consists of a layer of $SiN_x$ 10 atop a layer of glass 12. In the following line, we see the result of deposition a layer of resist 14 atop the starting substrate. In the following line, the resist has been nanoimprinted so that it has a pattern. In the following line, the patterned resist has been used as a mask in order to dry etch the $SiN_x$ layer, producing indentations such as 16 and thus leaving in the area where the indentations are not present a series of posts.

In the following line of FIG. 1A, the resist has been removed. In the bottommost line of FIG. 1A, we see the result of deposing a magnetic material 18, for example a Ta/(Co/Pd)$_n$/Pd multilayer, atop the substrate following removal of the resist. The depth of the etch into the disk is preferably sufficient to assure adequate magnetic decoupling of the magnetic materials deposited on the tops of the posts such as 20 from those materials deposited in the valleys between and surrounding the posts. Typical depths for the etch into the disk are 40-50 nm. It is in general desired that there be a density of posts corresponding to the bit density to be achieved, for example, 100 billion posts per square inch, 200 billion posts per square inch, 300 billion posts per square inch, 400 billion posts per square inch, 500 billion posts per square inch, 700 billion posts per square inch, or 1000 billion posts per square inch. A density of 500 billion posts per square inch would mean a separation between posts of approximately 35 nm.

In the top line of FIG. 1B, we see the following step of the exemplary process, which deposits a DLC stop layer 22 above the layers deposited previously. Typical thicknesses for the DLC layer are 2-10 nm. The following line shows the result of depositing a filler 24, which may be silicon dioxide, alumina, or another suitable material. Finally, the bottom line of FIG. 1B depicts the result of subjecting the substrate with the layers so far deposited to chemical-mechanical polishing (CMP).

In an alternative embodiment of the invention, there is provided a method of forming a plurality of islands of magnetic material atop a substrate having a first approximately planar surface. The method comprises the steps of depositing magnetic material over the first approximately planar surface, selectively removing portions of the magnetic material so as to leave islands comprising the material, and depositing filler material atop the substrate produced in the preceding step. The filler material may then be planarized by known techniques.

The step of selectively removing portions of the magnetic material may be assisted by the use of a mask. In a preferred embodiment, the mask is formed by depositing a mask material, depositing resist atop the mask material, patterning the resist, transferring the resist pattern to the mask material, and removing the remaining resist. The mask material is preferably DLC with thickness between 2-10 nm. The patterning of the resist may occur by any method, for example those listed above, with nanoimprinting being particularly preferred. The transfer of the resist pattern to the mask material may employ any suitable method, such as reactive ion etching.

Once a mask is in place, the selective removal of portions of the magnetic material may occur by any suitable method, for example ion milling. It is commonly desired that this selective removal result in leaving pillars of magnetic material on the substrate. Each of these pillars may be left covered with the remaining mask material at the top. Above this, filler material may be deposited covering the pillars and the spaces between them.

Once the filler material has been deposited, it may be planarized by any suitable method such as chemical-mechanical polishing (CMP). Where the mask material is a suitable stop material for the planarization, e.g., as where DLC mask material is used together with CMP, leaving the mask material on top of the pillars is helpful to simplify processing.

The magnetic materials usable in this embodiment will generally be the same as those set out above in connection with earlier embodiments.

In line with the discussion above, in disk drive applications the size and spacing of the pillars formed in this process will be as appropriate for the density of recording sought to be achieved. Thus for example if the density is 500 billion bits per square inch, one may calculate that 500 billion~707107$^2$ so that a linear density of 707107 pillars per inch will give 500 billion bits per square inch. In more familiar units, 707107 pillars per inch means that the pillars should be spaced approximately 35 nm apart (0.0254 meters/inch divided by 707107 pillars per inch). In embodiments that have pillars made primarily of magnetic material, there is a desire to have these pillars be as tall as the fabrication technology can usefully make them, e.g., an aspect ratio of 2:1, 3:1, 4:1 or 5:1 (height/diameter).

Figure 2:
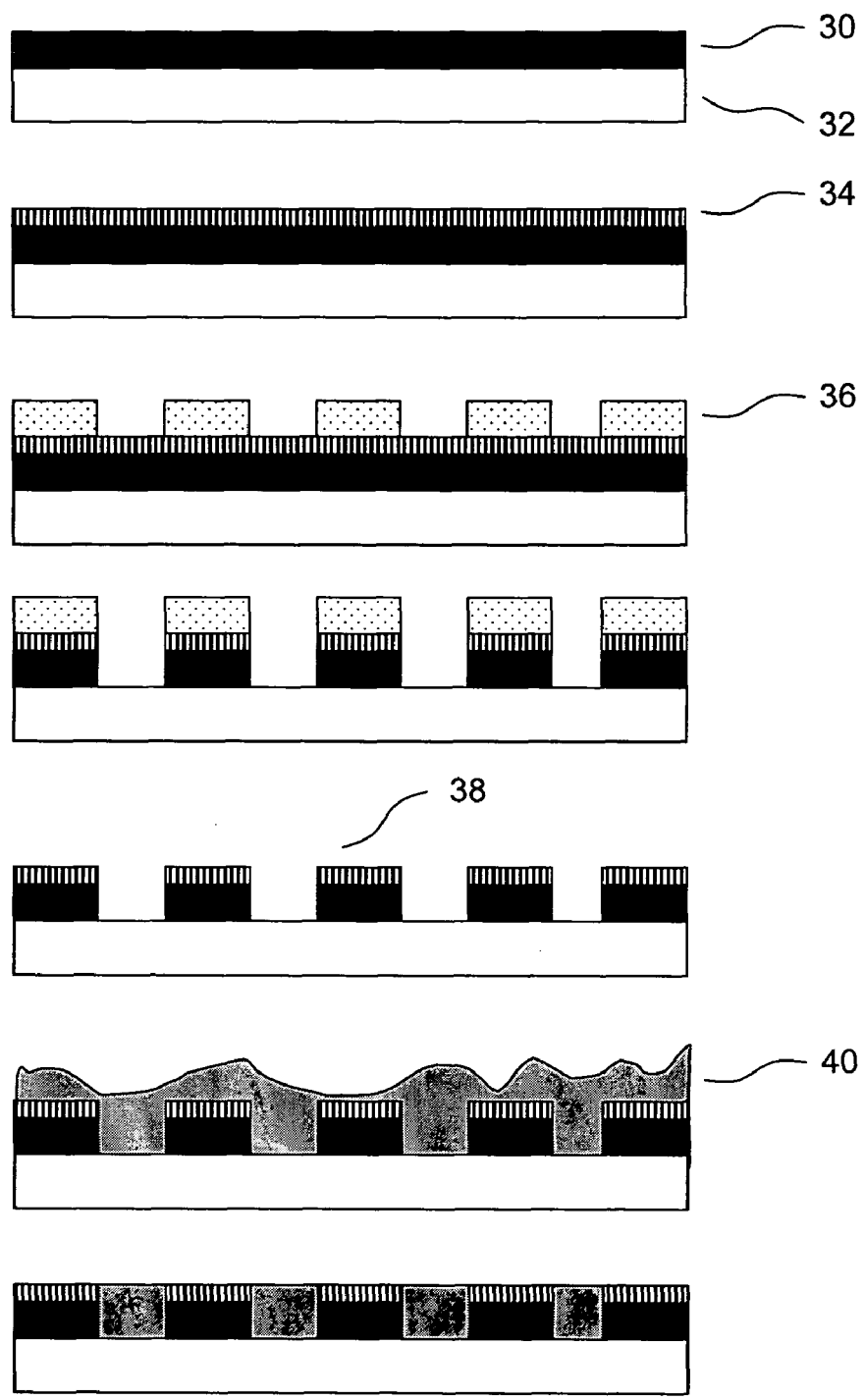
FIG. 2 depicts schematically (not to scale) the state of a substrate after successive processing steps making up an alternative method of the invention.

FIG. 2 depicts a particular embodiment of the invention. In the first line, one sees that a magnetic material 30 has been deposited on a suitable substrate material 32 such as glass or silicon. A mask material 34 such as DLC is then deposited on top of the magnetic material. A resist material 36 is then deposited on the mask material and patterned by, for example, nanoimprinting. In the next line, we see that the pattern of the resist has been transferred to the mask material and then to the underlying magnetic material, via processes such as reactive ion etching or ion milling. The resist is then removed as seen in the next line, leaving pillars such as 38. The filler material 40 (e.g., alumina) is then deposited, and is then planarized as shown in the bottommost line of FIG. 2.

Figure 3A:
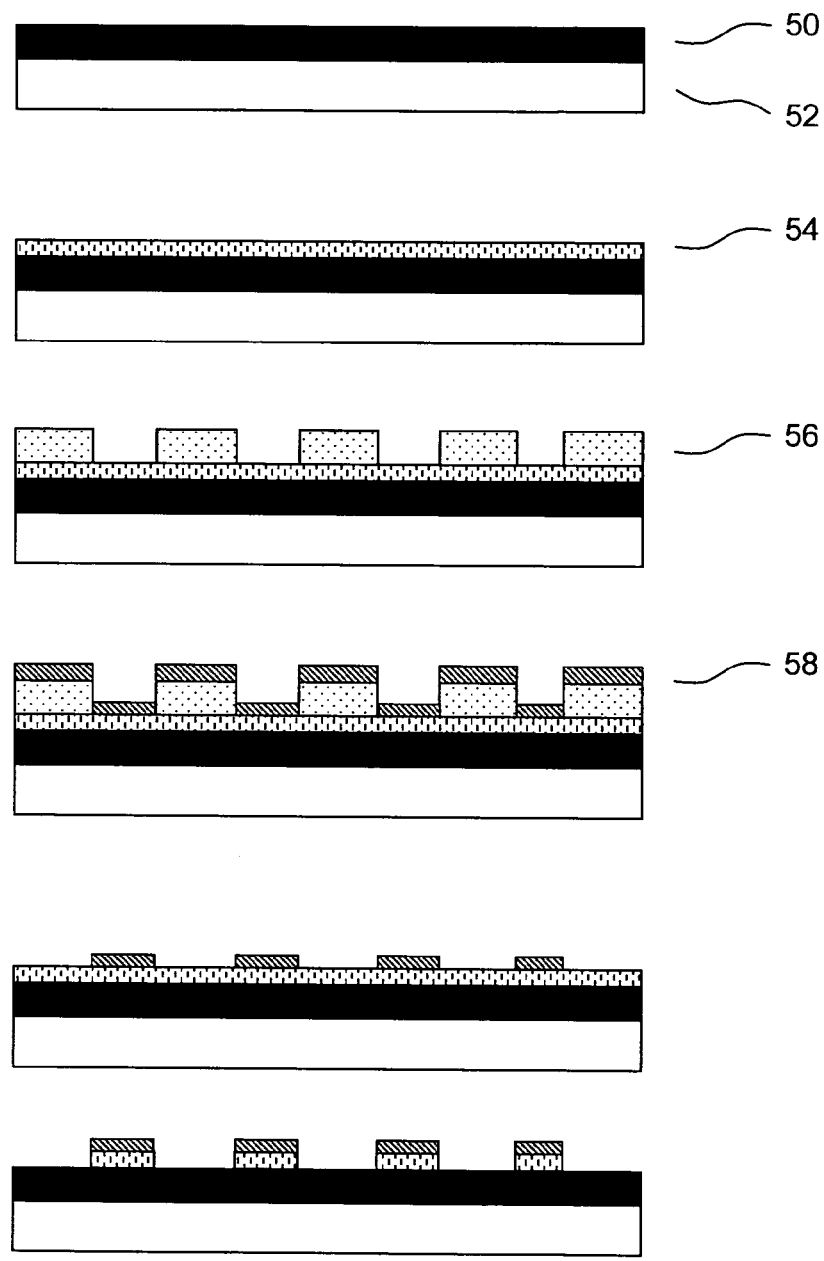
FIGS. 3A-3B depict schematically (not to scale) the state of a substrate after successive processing steps making up a further method of the invention.
Figure 3B:
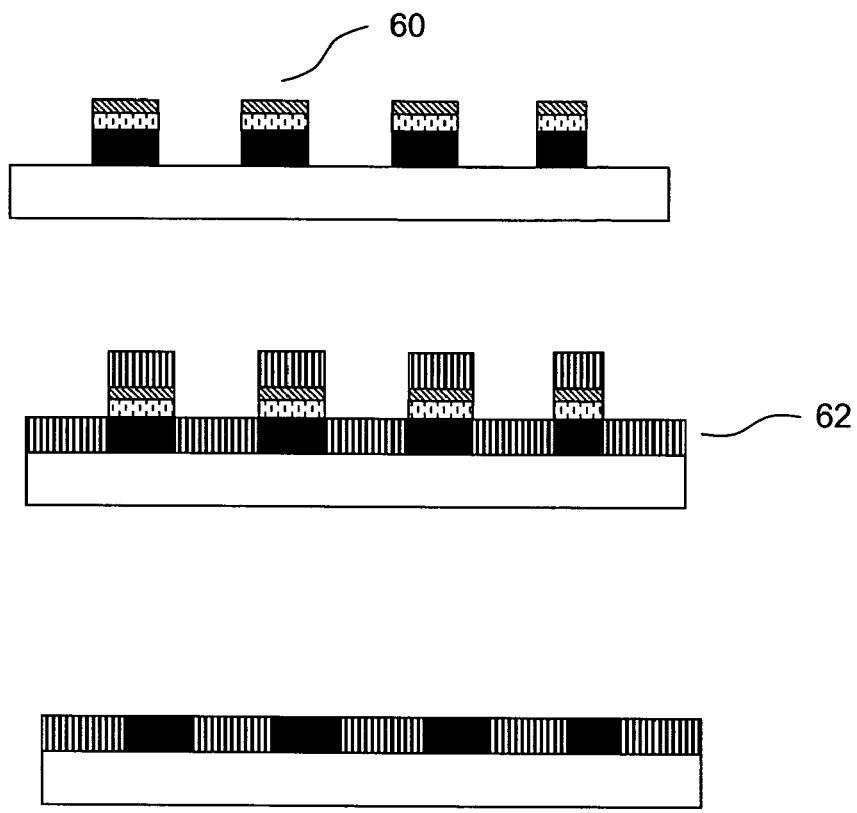

FIGS. 3A and 3B depict a different embodiment of the invention. As in the embodiment of FIG. 2, we start in the top line of FIG. 3A with magnetic material 50 deposited on a suitable substrate material 52. The mask material 54, which may be for example 30-50 nm thick polyimide, is deposited atop the magnetic material. Patterned resist 56 is deposited atop the mask material, the patterning being accomplished by any suitable means. A suitable metal 58 (e.g., Ge, Ta, Ti) is then deposited, and resist is removed by means of a lift-off procedure. This leaves a metallic mask atop the mask material. Using that metallic mask, the mask material is patterned, for example by a suitable etching process, leaving the substrate in the state depicted at the bottom of FIG. 3A.

The manufacturing process continues, as shown in the top line of FIG. 3B, by transferring the pattern now present in the metal and mask material to the magnetic material, thus forming pillars such as 60. The transfer may occur, for example, by ion milling. The substrate with the pillars is then covered with a stop material 62, with the deposition being carried out so that the amount of stop material between the pillars matches the height of the magnetic material. At that point, planarization is carried out, leaving pillars of magnetic material surrounded by stop material, as depicted in the bottom row of FIG. 3B.

FIG. 4 depicts another embodiment of the invention. As in FIG. 2A, magnetic material 70 is deposited upon a suitable substrate 72, a mask material 74 is deposited on top of the magnetic material, and photoresist 76 is deposited atop the mask material and patterned by nanoimprinting. The resist pattern is transferred to the mask material and then to the magnetic material. At that point, filler material 80 and then additional mask material 78 are deposited. The deposition is again arranged so that the thickness of the deposited material approximately equals that of the magnetic material, and thus the mask material again forms an approximately continuous sheet atop the magnetic and filler material. The resist and materials atop the resist are then removed, e.g., by CMP-assisted lift-off, leaving a surface which is approximately planar and can be planarized and lubricated with a lubricant 82, as shown in the bottom line of FIG. 4.

In FIG. 5 a variant of the process of FIG. 4 is depicted. Following the transfer of the resist pattern to the magnetic material we have the situation shown in the top line of FIG. 4, with pillars such as 90 containing magnetic material, mask material, and resist. At that point, unlike in FIG. 4, the remaining resist is removed, e.g., chemically. The process then proceeds as in FIG. 4, with deposition of filler material and mask material to a depth matching that of the magnetic material and then removal of the filler and mask material lying above the original level of the mask material, e.g., via CMP-assisted lift-off. Planarization and lubrication may follow.

In FIG. 6 a variant combining the processes of FIGS. 1A-1B and FIG. 5 is shown. The top line shows the result of the process steps of FIG. 1A, which result in indentations 100 containing magnetic material topped by a stop material, and pillars 102 with magnetic material and stop material atop a different material, so that the magnetic material in depressions 100 and pillars 102 is spatially separated. Now, instead of depositing just filler as in FIG. 1B, we deposit both filler 106 and additional stop material 104. Following the removal of the material atop the pillars by CMP-assisted lift-off, there remains a continuous layer 108 of stop material, as in FIG. 5. Further processing may occur as in FIG. 5.

In reading FIGS. 1A-6 the person of skill in the art will understand that the representation of the results of deposition is schematic. While in general it is desired that there be no step coverage, so that all particles being deposited would have a path which is straight down if the substrate is horizontal, it will be recognized that this may not be achievable in practical methods of deposition. Alternatively, for example with respect to the magnetic material, if it is applied in layers, layers of one material may be applied pointing straight down, and layers of the other material at a raking angle, so that the sidewalls and bottoms are mostly composed of one material and create little magnetic coupling between the multilayer material at the tops of different pillars.

As has been indicated above, a preferred use of the methods of the invention is to manufacture patterned magnetic recording media suitable for use as disks in hard disk drives. The scope of the invention also encompasses hard disk drives which contain patterned magnetic media. Such a disk drive comprises one or more data storage media or disks on which data is stored in digital form on magnetic bits disposed on the disk for receiving the data. The disks rotate at speeds of 3600 rpm, 7200 rpm, or higher. Magnetic bits are disposed in concentric rings circling the center of the disk, each bit consisting of a region of magnetic material spatially separated from other such regions. The hard disk drive has the ability to write and overwrite data to bits, as well as read the data stored on the bits. This is generally accomplished by means of one or more magnetic heads which are mounted on sliders, in turn mounted on arms with appropriate suspensions, acting under the control of an electronic controller. The arms generally move in such a way that the heads can be positioned over any desired radial position of each disk. When the disk is in operation, the heads fly over the surface of each disk, being kept apart from the surface by air bearings which form part of the sliders. The heads create a suitable magnetic field for writing which causes a bit to shift its state to align itself with the field, while they sense the magnetic fields at each point on the surface of the disk for reading.

It is to be understood that while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

EXAMPLE 1

A silicon substrate was prepared by depositing 200 nm silicon dioxide atop it. Resist was placed on the silicon dioxide and then patterned both optically and with an electron beam. The silicon dioxide was etched and the resist removed. The optical patterning left hollow cylindrical pillars and rows of synchronization marks. The electron beam patterning left square areas of pillars which were 100 µm by 100 µm and disposed 1000 µm apart from each other. Within each square area of pillars, the electron beam patterning left pillars at a particular density, chosen from among 101 billion per inch$^2$, 213 billion per inch$^2$, and 318 billion per inch$^2$. Following this patterning of the SiO$_2$, 30 nm of NiFe, 5 nm of DLC, and 250 nm of SiO$_2$ were deposited.

The result of this patterning is shown in FIGS. 7 and 8, which are based on measurements made by atomic force microscopy. In FIG. 7, one can see the hollow cylindrical pillars made by optical lithography at the bottom left. In the upper right half of the figure one can see first the synchronization marks also made by optical lithography, and then to the right of them a part of a square area of pillars made by electron beam patterning. In FIG. 8, one sees in greater detail the pillars in the square area made by electron beam patterning. The optical features were measured to be 41 nm above the field SiO$_2$ while the electron beam pillars were 33 nm above that.

At this point chemical-mechanical polishing was carried out. The CMP tool was a tabletop polisher with a 15 inch pad. An IC1000 pad with Suba IV subpad was employed together with a silica slurry. An increase in the coefficient of friction, attributed to the DCL stop layer, was used as an indicator to stop the polishing.

The result of the CMP is depicted in FIG. 8, also based on atomic force microscopy. It may be seen that the electron beam pillars were smoothed down by the CMP to a height of about 3 nm.

EXAMPLE 2

The fabrication process started with a glass disk coated with 40 nm of Silicon Nitride (SiNx). The disk was coated with 85 nm of PMMA electron beam resist. After electron beam lithography exposure of the patterns, resist was developed and the sample coated with 20 nm of chromium. Using NMP solvent, Cr metal was lifted off and a pattern of Cr dots was created. The Cr metal pattern was transferred into a SiNx film using reactive ion etching employing CF$_4$ gas chemistry. After the SiNx pillar pattern was created, magnetic media was sputter-deposited on the patterned disk substrate. A cross-sectional SEM image (FIG. 10A) of the patterned disk substrate demonstrates that the amount of material deposited on the sidewalls may be controlled. The topographic AFM image (FIG. 10B) and magnetic force microscopy (MFM) image (FIG. 10C) of a patterned media disk at moderate bit areal density of 100 Gb/in$^2$ demonstrate that individual islands are successfully magnetically isolated, with two magnetic states clearly visible. That the islands are magnetically isolated is confirmed by observing a random pattern of magnetically oriented bits, instead of large regions of many bits oriented in the same direction.

We claim:

1. A method of forming a plurality of regions of magnetic material in a substrate having a first approximately planar surface, comprising:
   fabricating a plurality of projections in the first surface of the substrate such that each projection comprises a top;
   depositing, onto the first surface of the substrate after fabrication of the projections, a magnetic material in such a way that the tops of the projections are covered with the magnetic material and the magnetic material on the top of each projection is magnetically decoupled from the magnetic material on the tops of the other projections;
   depositing stop material atop the substrate produced in step b), the stop material comprising a material chosen from the group consisting of diamond-like carbon, TaN, TiN, and tantalum; and
   depositing filler material above the stop material deposited atop the substrate.

2. The method of claim 1, wherein the fabricating comprises: depositing a the mask material atop the first surface of the substrate, depositing resist atop the mask material, patterning the resist, transferring the pattern in the resist to the mask material, and removing the mask material.

3. The method of claim 2, wherein the mask material is chosen from the group consisting of silicon nitride and silicon dioxide.

4. The method of claim 1, further comprising depositing a layer of further material atop the filler material.

5. The method of claim 1, wherein the magnetic material comprises multiple layers.

6. The method of claim 5, wherein the magnetic material comprises Ta, (CoIPd), and Pd layers.

7. The method of claim 1, further comprising planarizing the filler material.

8. The method of claim 7, wherein the planarizing of the filler material comprises chemical-mechanical polishing (CMP).

9. The method of claim 2, wherein the mask material is removed using reactive ion etching.

10. The method of claim 7, further comprising depositing a mask atop the magnetic material such that the mask serves as a stop material for the planarizing.

11. The method of claim 1, wherein the filler material is deposited to a thickness approximately equal to the tops of the projections covered with the magnetic material.

12. The method of claim 1, wherein the projections are spaced at a density of at least about 300 billion per square inch.

13. A method of forming a plurality of regions of magnetic material in a substrate having a first approximately planar surface, comprising:
   fabricating projections in the first surface of the substrate such that each projection comprises a top;
   depositing, over the first surface of the substrate after fabrication of the projections, a magnetic material in such a way that the tops of the projections are covered with the magnetic material and the magnetic material on the top of each projection is magnetically decoupled from the magnetic material on the tops of the other projections;
   depositing a mask atop the magnetic material;
   depositing filler material above the substrate;
   depositing a further layer of material atop the filler material, the further layer of material being deposited to approximately the same thickness as the mask; and
   planarizing the filler material by applying spin-coated or dip-coated polymer and planarization of the applied polymer by disk burnishing.

14. The method of claim 7, wherein the planarizing of the filler material comprises planarization with a directional high-incidence-angle broad ion beam.

15. The method of claim 7, wherein the planarizing of the filler material comprises application of spin-coated or dip-coated polymer and planarization of the applied polymer by disk burnishing.

16. The method of claim 13, wherein the projections are spaced at a density of at least about 300 billion per square inch.

17. The method of claim 9, further comprising patterning the mask material using a resist material deposited atop the mask material.

18. A method of forming a plurality of regions of magnetic material in a substrate having a first approximately planar surface, comprising:
   fabricating a plurality of projections in the first surface of the substrate such that each projection comprises a top, the fabricating comprising:
      depositing a mask material atop the first surface of the substrate,
      depositing resist atop the mask material,
      patterning the resist,
      transferring the pattern in the resist to the mask material, and a
      removing the mask material;
   depositing, onto the first surface of the substrate after fabrication of the projections, a magnetic material in such a way that the tops of the projections are covered with the magnetic material and the magnetic material on the top of each projection is magnetically decoupled from the magnetic material on the tops of the other projections;
   depositing filler material above the substrate; and
   removing the resist via lift-off.

19. A method of forming a plurality of regions of magnetic material in a substrate having a first approximately planar surface, comprising:
   fabricating projections in the first surface of the substrate such that each projection comprises a top;
   depositing, over the first surface of the substrate after fabrication of the projections, a magnetic material in such a way that the tops of the projections are covered with the magnetic material and the magnetic material on the top of each projection is magnetically decoupled from the magnetic material on the tops of the other projections;
   depositing a mask atop the magnetic material, the mask having a thickness, the mask comprising a first material;
   depositing filler material above the substrate;
   depositing a further layer of material atop the filler material, the further layer of material comprising the first material; and
   planarizing the filler material by applying spin-coated or dip-coated polymer and planarization of the applied polymer by disk burnishing.

* * * * *